April 17, 1951  R. D. MAYO  2,548,987
AUXILIARY FUEL TANK AND PUMP

Filed Aug. 24, 1949  2 Sheets-Sheet 1

INVENTOR
ROBERT D. MAYO
BY Liverance and
Van Antwerp
ATTORNEYS

April 17, 1951  R. D. MAYO  2,548,987
AUXILIARY FUEL TANK AND PUMP
Filed Aug. 24, 1949  2 Sheets-Sheet 2

INVENTOR
ROBERT D. MAYO
BY Liverance and
Van Antwerp
ATTORNEYS

Patented Apr. 17, 1951

2,548,987

UNITED STATES PATENT OFFICE 2,548,987

AUXILIARY FUEL TANK AND PUMP

Robert D. Mayo, Flint, Mich.

Application August 24, 1949, Serial No. 112,047

10 Claims. (Cl. 226—112)

This invention relates to a novel auxiliary gasoline container with which is used a novel fuel pump, to pump fuel from the container to the tank of a small motor, the invention primarily being for use for replenishing the fuel in the tanks of outboard motors. It is also useful wherever a tank of small capacity frequently requires fuel as in the engines of motorcycles and the like. The fuel tanks for example in outboard motors have small capacity from which the fuel may become exhausted when a boat with the motor is on the water away from shore and, in many cases, the boat is being pushed about by waves or under different conditions which cause a rising and falling of the water. Fueling such outboard motor tanks must be through an inlet to the tank which is small, and fuel is frequently spilled over the tank, or the engine and the boat, or upon the surrounding water, with the resultant loss and danger coming therefrom. With most two cycle engines the engine is lubricated by mixing oil with the gasoline fuel and such mixture should be thoroughly done before the engine tank is supplied with the fuel.

With my invention, the fuel and lubricating oil may be thoroughly mixed in an auxiliary tank which is supplied with connections by means of which it is operatively joined with the engine fuel tank in a sealed tight condition. The auxiliary tank is equipped with a pump for manual operation, the operation of which will pump the fuel from the auxiliary tank to the engine tank and simultaneously remove air from the engine tank and deliver it to the auxiliary tank, the pressure conditions within both tanks remaining substantially constant. The auxiliary tank is also supplied with a means whereby the fuel and lubricant may be mixed by operation of the auxiliary tank, such means also permitting an intermixture of the lubricant and gasoline fuel at a service station where the fuel and lubricant are bought, by application of compressed air which most service stations are equipped to supply.

I have heretofore obtained Patent No. 2,405,242, granted August 6, 1946 for an auxiliary gasoline container. The present invention has for its object and purpose many improvements resulting in economy in structure, certainty of operation, maintaining pressure within both the auxiliary and the fuel tanks at substantially constant pressure and, in general, providing a much improved auxiliary gasoline container through novel structure and by means of which a transfer of fuel from the auxiliary tank of the invention to the relatively small tanks of the small engine, usually of the two cycle type used with outboard motors, motorcycles and the like, is performed with no loss of gasoline, and may be done at any time. With the present invention when the fuel tank of the engine is filled to a maximum height any continued pumping of gasoline mixed with the lubricant from the auxiliary tank merely provides circulation of the fuel, excess fuel being returned to the auxiliary tank upon continued pumping.

An understanding of the invention may be had from the following description, taken in connection with the accompanying drawings, in which, Fig. 1 is an elevation with parts broken away, and some parts in longitudinal vertical section, of the auxiliary gasoline fuel tank of my invention.

Like reference characters refer to like parts in the different figures of the drawings.

Figure 1:
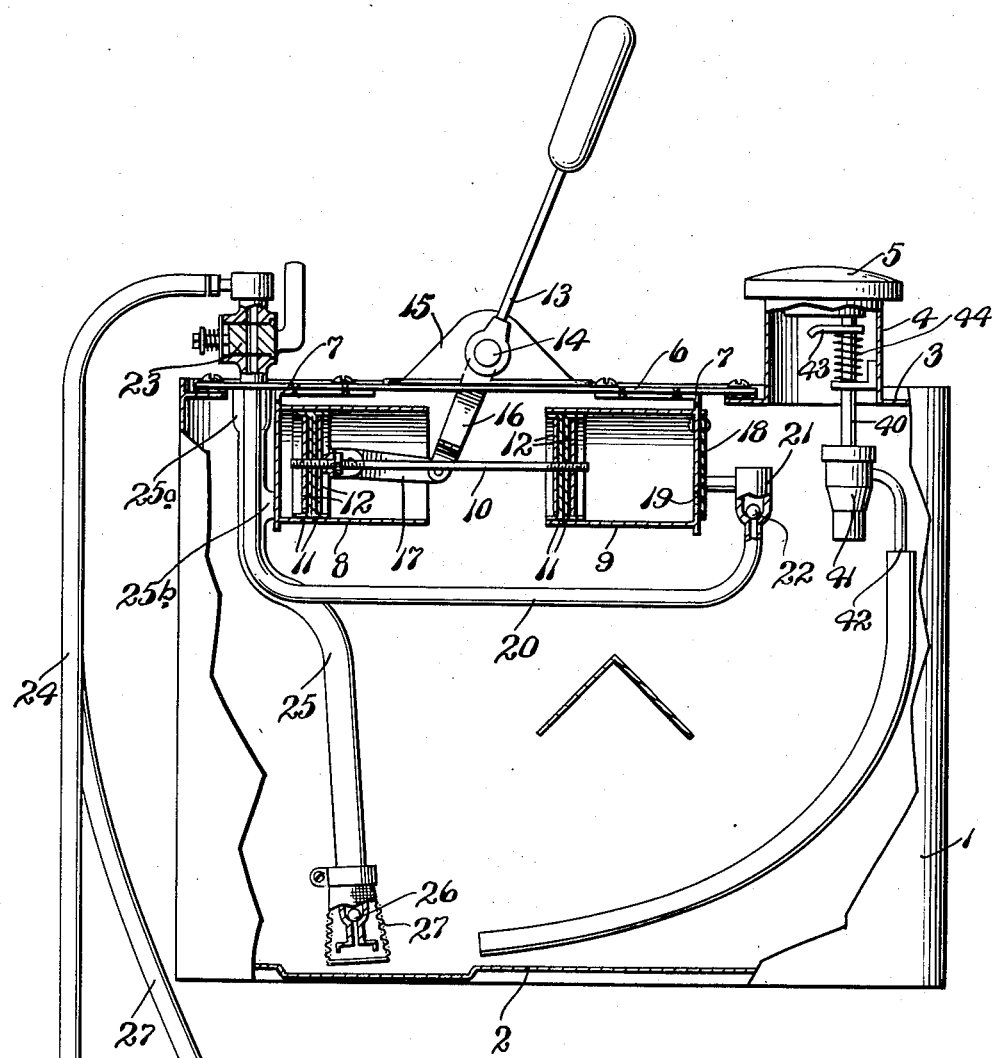
Figure 2:
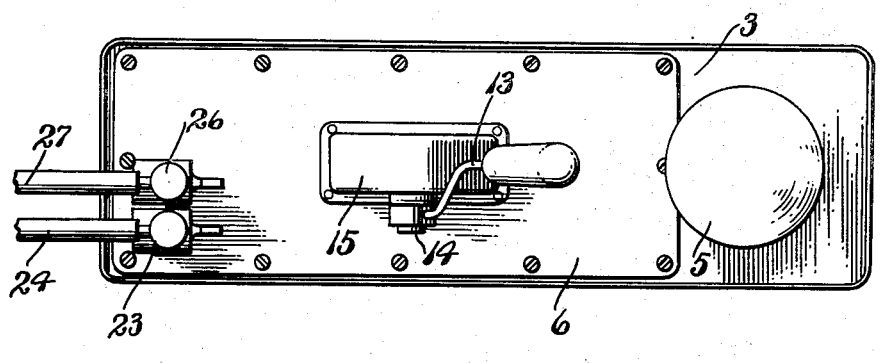
Fig. 2 is a plan view thereof.

The auxiliary tank has vertical walls 1, a bottom 2 and a partial top 3 all of thin metal. In the partial top 3, an inlet sleeve 4 is connected normally closed by a removable closure cap 5 similar to the closing cap which is used with tanks of motor vehicles and the like. Its removal opens the inlet at its outer end for the delivery of the fuel to the interior of the auxiliary tank.

The major portion of the top of the tank is removed to provide an opening which is closed by a rectangular top plate 6, beneath which and the edge portions of the top 3 around the opening a suitable gasket is provided, the plate 6 being screw connected and pressing against the gasket to provide a liquid and substantially airtight closure. At the underside of the plate 6 the pump of my invention is mounted. The removal of the plate 6 will remove the entire pump structure from the tank. Therefore, the pump unit carried on the plate 6 is first assembled and connected with said plate, the attachment of the plate being substantially the last step in the assembly of the auxiliary tank structure. And of course, such plate 6 with the pump mechanism secured thereto may be removed at any time for inspection of the pump and any reconditioning or repair thereof.

At the underside of the plate 6 and adjacent each end, two supporting brackets 7 are secured by permanent connecting means such as spot welding, riveting or the like, each having downwardly extending or vertical legs which may be utilized as the bottoms or closed ends of two cylinders 8 and 9 mounted immediately below the plate 6 and located horizontally with their open ends presented toward each other. The two cylinders have a common horizontal axis. A rod 10 located at the axis of the cylinders extends between them and at its opposite ends into the open ends thereof. On the rod 10 a piston is mounted adjacent each end. Each piston comprises two cup leathers 11 located back to back and with their flanges extending opposite each other and holding plates 12 at the outer sides of the cup leathers 11 threaded onto the ends of the rod 10. Both pistons therefore are connected together for simultaneous operation, one moving toward the closed end of its associated cylinder while the other is moving away from each closed end of its cylinder.

A handle 13 for operating the pistons is located above the plate 6 and is connected with a shaft 14 suitably packed for air tightness which is mounted to rock about a horizontal axis and extend into a housing 15 connected in sealed relation to plate 6. From within the housing, a yoke 16 passes downwardly through the plate 6 and at its lower end is connected to two connecting bars 17 which extend toward one of the plates 12 of one of the pistons, the one shown in the cylinder 8 in Fig. 1, and pivotally connected thereto. The handle 13 is rocked back and forth whereupon the pistons are simultaneously reciprocated.

The bottom of the cylinder 9 has a flat valve 18 secured at one end to its outer side and at its free end portion covers a vent opening 19 in the bottom of the cylinder. Thus when the piston in the cylinder 9 is moved toward the bottom or closed end thereof, air is forced out through the opening 19, the flat valve yielding for such purpose but on the movement in the opposite direction the valve 18 closes opening 19 and air must come into the cylinder 9 through a pipe 20 which is connected with the bottom or closed end of the cylinder, there being in pipe 20, adjacent the cylinder 9, a housing 21 and a check valve 22, such check valve permitting a flow of air into the cylinder but preventing escape therefrom on the movement of the piston toward the closed end of the cylinder 9. The air in such case is forced to pass into the tank by escape through the opening at 19. The pipe 20 leads underneath both cylinders and thence to the plate 16 and is connected with a valve structure in the form of a petcock 23 with which a hose conduit 24 is connected at one end. Thus when the petcock 23 is open, on movement of the piston in the cylinder 9 away from the closed end thereof, air is drawn through the hose 24 and through the petcock valve 23 when it is open, as in Fig. 1, and thence through the pipe 20 into the cylinder.

A pipe 25 extending generally vertically in the tank, near its lower end is equipped with a check valve 26. The lower end portion of the pipe is surrounded by a screen 27. The gasoline fuel in the tank is withdrawn therefrom through pipe 25 into the cylinder 8 through a passage which is made in an offset 25b leading from the pipe 25 through the bottom or closed end of the cylinder. Near its upper end, immediately underneath the plate 6, pipe 25 is enlarged, as indicated at 25a, and a check valve similar to the valve 26 is located therein above the connection between the pipe and the cylinder 8. A second petcock valve 26 is connected at the upper end of the gasoline pipe 25 above the plate 6, to which a hose conduit 27 similar to the conduit 24 is secured at one end.

The two hose conduits 24 and 27 at their outer ends have a detachable connection with a fitting which may be secured to the top of the engine tank which is to be supplied with fuel from the auxiliary tank. This fitting or attachment includes a sleeve member 28 closed at one end and exteriorly threaded for the major portion of its length from the other end. A metal tube 29 passes through the closed end of the sleeve 28 and axially therethrough. A second tube 30 is permanently connected by soldering or other equivalent means to and having communication with the interior of the sleeve 28 adjacent its closed end. Opposite the connected end of the tube 30 a vent opening 31 is made through the wall of the sleeve member 28 which may be opened or closed by operating the screw 32.

A relatively thick rubber member 33 is located around the threaded portion of the member 28. At opposite lower ends of which are a washer 34 and an interiorly threaded disk 35, the former being of larger diameter than the latter. At the outer sides thereon are additional nuts 36 and 37, respectively, of the same diameter as their associated parts 34 and 35. The rubber member 33 may be compressed between the nuts 35 and 36.

When released and free from compression the lower nuts 35 and 37 and the rubber member 33 will pass through the inlet opening in the top 38 of the engine tank. When they have been thus located washer 34 of larger diameter than the opening through the top 38 of the tank comes against such top and the upper nut 36 is tightened to compress and squeeze the rubber member 33 against the flanged sides around the opening in the top of the tank, making a tight sealing connection.

The outer ends of the two hose conduits 24 and 27 are detachably connected by means of well-known conventional connecting devices 39 to the ends of the hose conduits 24 and 27 respectively. As indicated at 39, such connections readily permit a disconnection of the associated tubes 24 and 27 from the metal tubes 30 and 29.

With the tank 1 supplied with the mixed gasoline and lubricating oil fuel, in a motor boat for example, the two hose conduits 24 and 27 are connected to the pipes 30 and 29, respectively, the detachable connections at 39 being operable to either connect or disconnect the auxiliary tank with the engine tank. On operating the pump handle 13, fuel which has been drawn into the cylinder 8 is forced out and follows the hose 27 to and through the pipe 29 and is delivered to the engine tank. Such forcing of fuel occurs when the piston within the cylinder 8 is moved to the left (Fig. 1). The other piston within the cylinder 9 simultaneously moving in the same direction draws air into the cylinder 9 through the pipe 20 which is connected with the hose conduit 24 to pipe 30, air being taken from the engine tank through the annular passage around the pipe 29. Thus for a volume of liquid taken from the tank 1, a compensating volume of air is delivered thereto, maintaining pressure substantially constant. The same is true of the engine tank, wherein a volume of liquid fuel delivered to the engine tank is compensated by an equal volume of air taken therefrom which is delivered to the auxiliary tank. On the fuel reaching the open lower end of the member 28, instead of air being withdrawn from the engine tank fuel will be withdrawn therefrom, and it is impossible to overfill the engine tank as, when a predetermined level of fuel therein is reached, there is merely a circulation of fuel from one tank to the other and back again. The several check valves at 22 and 26 and within the part 25a together with the flap valve 18 compel the circulation of the liquid and the air in the manner described.

Within the inlet 4 and extending below it is a short vertical pipe 40 connected by a connection 41 to a conduit 44 which extends substantially to the bottom of the tank. The pipe 40 extends slidably through a bracket secured to the inner side of the inlet 4 above which on the pipe 40 is a second bracket 43. Between the brackets a coiled compression spring 44 is located. When free to do so the spring 44 elevates the pipe 40 and the bracket 43 may be hooked at its free end over the upper end of the inlet 4. Compressed air at a service station forced through the pipe 40 connected to the bottom of the tank agitates the liquid therein to thoroughly mix the gasoline and lubricating oil to a proper homogeneity for two cycle engines.

In many cases a supply of compressed air is not available when the auxiliary tank is filled. When this is the case the conduit 27 is disconnected from the pipe 29 and is inserted through the inlet 4 into the auxiliary tank so that the liquid pumped from the tank 1 is returned to it. The other conduit 24 is disconnected and its free end is open for communication with the outside atmosphere. And after a sufficient time of pumping and recirculation of the liquid within the auxiliary tank it is thoroughly and homogeneously mixed. The screw at 32 is turned outwardly to uncover the vent 31 after the engine tank is filled, such screw having been in a position to close such vent at the times when the liquid fuel is transferred from the auxiliary to the engine tank. The vent at 31 is required to maintain pressure in the engine tank at atmospheric pressure and avoid any vacuum in such tank while the engine is running. Whenever the auxiliary and engine tanks are connected together for filling the engine tank they are sealed as tightly as possible against either entrance or escape of the liquid fuel, or air. This insures against fire dangers which would come from spilling gasoline over the outside of either the engine or its tank or adjacent parts of the boat or on the water.

Figure 3:
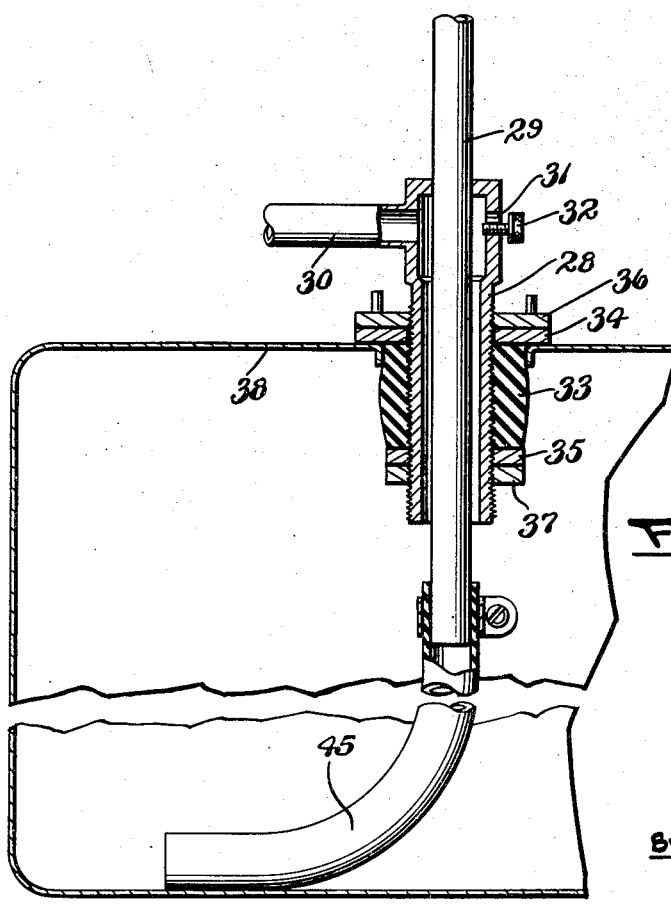
Fig. 3 is a somewhat enlarged vertical section showing the attachment or connection used at the inlet of the engine tank and with which the auxiliary tank of my invention is adapted to be operatively connected.

The pump may be used to withdraw fuel from the engine tank, if such withdrawal is wanted, and return it to the auxiliary tank. In Fig. 3, a flexible tubular extension may be connected to the lower end of the fuel inlet pipe 29 of a length sufficient to reach to the bottom of the engine tank. The flexible tube will be of a suitable material which is not deteriorated by long submersion in the fuel.

When the engine tank is to be emptied of its fuel, the connection of the flexible hose conduit 27 to the pipe 29 is broken also the conduit 24 is disconnected from the pipe 30. The hose conduit 24 is then connected to the pipe 28 and the hose 27 at its free end is inserted into the inlet 4, cap 5 being removed. In operation of the pump by rocking the handle 13, the fuel in the engine tank is drawn upwardly through pipe 29 and the hose 24 and thence through the pipe 20 to the cylinder 9. It is expelled from such cylinder through the outlet 19. The pumping of the fuel from the auxiliary tank upwardly through pipe 25 and thence through the conduit 27 returns such pump fuel to the auxiliary tank. The engine tank is open for the entrance of air as the fuel is emptied from it by air entering the pipe 30 at its open end and thence through the sleeve 28 to the tank. Thus, the invention is usable to fill the engine tank from the auxiliary tank at intervals whenever wanted, and also for emptying the engine tank and returning its fuel to the auxiliary tank as may frequently occur, particularly when an outboard motor is to be removed from a boat or when the boat is not to be used for a time.

The structure described is certain and sure in operation, is sturdy and durable and relatively simple to manufacture. The entire unit may be removed from the auxiliary tank on detachment of the plate 6. The auxiliary tank may be supplied with attaching means to secure it to the boat against aimless or other undesired movement.

The invention is defined in the appended claims and is to be considered comprehensive of all forms of structure coming within their scope.

I claim:

1. In a structure as described, a fuel supply tank adapted to contain liquid fuel, a pump in said tank including a cylinder and piston for withdrawing liquid from the tank and forcing it outwardly, a conduit for carrying liquid pumped, a connection adapted to be applied to a second tank to which the liquid is pumped, said conduit having attachment therewith to deliver the liquid pumped from the supply tank, a second pump within the supply tank including a piston and cylinder, a second conduit connecting said second pump with said connection to the tank to which the liquid pumped is delivered for withdrawing air from the tank to which the liquid is delivered by operation of the second pump, and means for simultaneously operating both pumps one to deliver liquid from the liquid supply tank to the second tank and one for withdrawing air from the second tank and delivering it to the supply tank.

2. A structure as defined in claim 1, the cylinders and said pump being located in alignment, said cylinders having open ends facing each other and closed ends away from said open ends, a common rod connecting the pistons of said pumps, and manually operable means connected with one of said pistons for moving it back and forth in its cylinder and through said rod simultaneously moving the other piston in its cylinder, said cylinders having substantially equal diameters and the pistons in the two cylinders being simultaneously operated equal amounts.

3. A structure as defined in claim 1, and a flexible conduit located within said second tank connected to the inner end of the first pipe and extending to the bottom of the tank.

4. In a structure as described, a liquid holding supply tank, a manually operable pump for pumping liquid therein, a second tank, connections between said pump and the second tank for carrying liquid pumped to said second tank, a second pump within the supply tank and connections between said tanks for withdrawing air from the second tank and delivering it to the interior of the supply tank, combined with means for operating the pumps simultaneously to maintain pressure within both tanks substantially constant.

5. A structure as defined in claim 4, said connections between the tanks being sealed connections preventing passage of air or liquid from or to the outside with respect to said tanks or the connections between them, and said pumps being of equal dimensions whereby the withdrawal of liquid from the first tank and delivery thereof to the second tank is compensated by an equal delivery of air to the first tank withdrawn from the second tank.

6. In a structure as described a tank adapted to hold liquid, two pumps of equal capacity mounted therein means for simultaneously operating said pumps equal amounts, conduits leading one from each pump to outside the tank, a pipe to which the outer end of one conduit is connected, a sleeve having a closed end through which said pipe passes and to which the other conduit is connected, the free ends of said sleeve and of said pipe being adapted to be inserted through an entrance opening into a second tank, means for securing said sleeve at the entrance opening of the second tank in sealed relation thereto, conducting means leading from the first pump, the conduit of which is connected with said pipe, extending from the pump substantially to the bottom of the tank for pumping liquid from the tank for delivery through the associated conduit and pipe connected thereto, and a valve associated with said outlet connected with the other pump, said pump having an outlet valve which closes for the withdrawal of air through said sleeve and second conduit by said other pump, and moving said valve to open said outlet for the delivery of said air to the tank from which the liquid is withdrawn.

7. A structure as described, a supply tank for holding liquid fuel, an engine tank to which the fuel is to be delivered from the supply tank, a pump connected with said supply tank for withdrawing and pumping fuel therefrom, a conduit connecting said pump and engine tank for carrying pumped fuel to the engine tank, a second pump, conduit connections between said second pump and the engine tank for withdrawing air from the engine tank and delivering it to the fuel supply tank, and means for operating said pumps simultaneously for maintaining pressure within said tanks substantially constant.

8. In a structure as described, a tank for holding liquid fuel, said tank having a relatively large opening in the top thereof, a plate detachably connected over said opening in the top of the tank in sealing relation thereto, a fuel pump connected to and located at the under side of said plate within the tank, a fuel carrying pipe connected with said pump extending to the bottom of the tank, conduit outside of the tank connected with said pipe, a second pump carried by and below said plate, a conduit connected with said second pump leading to and through the top of the tank to the outside thereof for drawing air into said second pump, said second pump having an air outlet and a valve closing said outlet when air is drawn into said second pump, said valve being moved to uncover said outlet between spaced intervals of withdrawing air into said second pump, said pumps having substantially equal capacity, and means for simultaneously operating said pumps to supply air from the outside to the interior of the tank simultaneously with withdrawal of fuel from the tank into the first pump.

9. In a structure as described a liquid supply tank having a relatively large opening in the top thereof, a plate detachably secured to the top of the tank covering said opening in sealing relation thereto, a pump including a cylinder having an open and a closed end connected with and located below said plate within the tank, a conducting conduit secured to the closed end of said cylinder and communicating with the interior of the cylinder through said closed end extending to the bottom of the tank and continuing through the top thereof, a second pump including a second cylinder having a closed end with an opening therein and an open end located in alignment with the first cylinder, with the open ends of the cylinders facing each other, a piston in each cylinder, a movable spring actuated valve mounted on the closed end of the second cylinder and normally closing the opening therein, a conduit connected with the closed end of said second cylinder leading therefrom to and through the top of said tank, a rod connecting said pistons, and means for reciprocating said pistons in their respective cylinders mounted on said plate and extending thereabove.

10. A structure as defined in claim 9, said conduit connected with the first cylinder having a check valve in the lower end thereof permitting passage of liquid upwardly and stopping downward passage therein, and a second check valve in said conduit above its connection with the first cylinder permitting free outward passage of liquid and preventing its return.

ROBERT D. MAYO.

REFERENCES CITED

The following references are of record in the file of this patent:

UNITED STATES PATENTS

| Number | Name | Date |
|---|---|---|
| 110,504 | Simmons | Dec. 27, 1870 |
| 135,074 | Brown | Jan. 21, 1873 |
| 253,932 | Lipps | Feb. 21, 1882 |
| 565,729 | Focht | Aug. 11, 1896 |
| 2,056,828 | Clawson | Oct. 6, 1936 |